United States Patent [19]

Kelledes et al.

[11] Patent Number: 4,624,334
[45] Date of Patent: Nov. 25, 1986

[54] ELECTRIC POWER ASSISTED STEERING SYSTEM

[75] Inventors: William L. Kelledes, Brighton; Walter K. O'Neil, Birmingham, both of Mich.

[73] Assignee: Eaton Corporation, Cleveland, Ohio

[21] Appl. No.: 646,371

[22] Filed: Aug. 30, 1984

[51] Int. Cl.$^4$ ............................................. B62D 5/04
[52] U.S. Cl. .................................... 180/79.1; 180/142
[58] Field of Search ............... 180/79.1, 142; 318/293, 318/300

[56] References Cited

U.S. PATENT DOCUMENTS

| | | | |
|---|---|---|---|
| 3,054,924 | 9/1962 | Wetzger et al. | 318/293 |
| 3,870,935 | 3/1975 | Abels et al. | 318/52 |
| 3,884,318 | 5/1975 | Abels et al. | 180/65 R |
| 4,056,160 | 11/1977 | Abels et al. | 180/143 |
| 4,173,265 | 11/1979 | Kremer | 180/79.1 |
| 4,184,333 | 1/1980 | Blaha et al. | 60/420 |
| 4,356,732 | 11/1982 | Hachtel et al. | 73/862.33 |
| 4,509,611 | 4/1985 | Kade et al. | 180/79.1 |
| 4,538,698 | 9/1985 | Hashimoto et al. | 180/79.1 |

FOREIGN PATENT DOCUMENTS

| | | | |
|---|---|---|---|
| 737075 | 7/1943 | Fed. Rep. of Germany | 318/293 |
| 58-8467 | 1/1983 | Japan | 180/79.1 |
| 58-177776 | 10/1983 | Japan | 180/79.1 |

*Primary Examiner*—Andrew M. Dolinar
*Attorney, Agent, or Firm*—Krass & Young

[57] ABSTRACT

An electrical power assisted steering system for a vehicle. The system includes a battery, having two terminals at different voltages and a center tap, and a bidirectional electric power assist motor having two terminals, one terminal being connected to the center tap of the battery. In an electric vehicle, said battery would be the traction battery. A control circuit responds to movement of the vehicle's steering wheel to generate a pulse width modulated (PWM) signal to drive the motor to assist in steering. The pulse widths are directly proportional to the driver's rotational displacement of the steering wheel and the amount of current flowing through the motor and inversely proportional to the speed of the vehicle. The PWM signal is applied to a selected one of two driving transistors, the first of which is connected between one of the terminals of the battery and the free terminal of the motor, the other of which is connected between the other terminal of the battery and the free terminal of the motor. Upon receipt of the PWM signal, the selected driving transistor connects the motor to its associated terminal of the battery to cause the motor to turn in a desired direction and deliver torque proportional to the width of the pulses. Also disclosed are monitoring circuits which monitor the operation of the control circuit and disconnect the motor from the battery when a malfunction is detected.

11 Claims, 5 Drawing Figures

ELECTRIC POWER ASSISTED STEERING SYSTEM

TECHNICAL FIELD

This invention relates to electrical power steering systems for vehicles, and more particularly, to a control system for such power steering systems.

CROSS-REFERENCE TO RELATED APPLICATIONS

This application is related in certain respects to U.S. Ser. No. 520,358 filed Aug. 4, 1983, and to two applications entitled "Fail-Safe Clutch Mechanism For Electrical Power Steering System" and "Improved Fail-Safe Device For An Electrical Power Assisted Steering System Including An In-Line Clutch Mechanism," filed on the same date and assigned to the same assignee as the present invention.

BACKGROUND OF THE INVENTION

Power steering systems for passenger and industrial vehicles often use an hydraulic system to provide power boost to the steering mechanism to assist the driver in steering. Hydraulic powered steering systems require a fluid pump in order to provide pressure for the fluid in the system. The pump requires a relatively large supply of electrical energy. In electric vehicles, an hydraulic pump drains the stored electrical energy from the vehicle's battery reducing the effective range of the vehicle. Even in gasoline powered vehicles, where electric power is more readily available, the power requirments of the pump reduce the gas mileage of the vehicle.

In addition, these steering systems generally have a valve which directs fluid power from a pump to a steering actuator when the steering wheel is rotated to steer the vehicle left or right. In general, there is a small range, typically 1° to 2° where the steering wheel has free play because the valve does not respond immediately to the motion of the steering wheel; it is desirable to minimize this play. Beyond this play is an active region of 4°–6° where boost is proportional to deflection.

In an effort to eliminate the drawbacks of hydraulic systems, some manufacturers have turned to electrical power assisted steering systems. Electrical systems are more efficient, requiring less energy than the power steering pump of the hydraulic systems. The system is typically greater and offers flexibility in location of components. A typical electrical power steering system uses an electric motor coupled between the positive and negative terminals of the automobile battery. A control circuit controls the operation of a set of switching transistors, usually four, energizing one pair of the transistors to turn the motor in a first direction, and energizing the second pair to turn the motor in the opposite direction.

While the electrical power steering systems have advantages over the hydraulic systems, the prior art systems also have certain drawbacks. For example, relatively complex control circuitry is required to control the operation of the switching transistors because two transistors must be energized to turn the motor in a given direction.

SUMMARY OF THE INVENTION

These difficulties encountered in the prior art are overcome by the electrical power steering system of the present invention. In our power steering system, a relatively high voltage vehicle battery, the typical traction battery found in an electric vehicle is center tapped and connected to one terminal of an electric motor. A single pair of switching transistors are provided, one being connected between the high voltage terminal of the vehicle battery and the remaining terminal of the motor and the other being connected between battery ground and the same terminal of the motor.

A control module controls the operation of the switching transistors as a function of steering commands generated by the operator of the vehicle, the current flowing through the motor and the vehicle speed. To turn the motor in a desired direction, one of the two switching transistors is energized to connect the motor between the appropriate terminal of the battery and the center tap. This causes the motor to turn, eliminating the need for a second set of transistors found in prior art systems. It also greatly simplifies the control circuitry. Center tapping the traction battery is possible because, in normal operation, the vehicle is turned just as often in one direction as the other. Consequently, the load on each side of the center tap is about equal during normal operation and in any case the load is small relative to the traction load.

In a preferred embodiment, the control module generates pulse width modulated signals to drive a selected one of the switching transistors as a function of commands generated by the driver, the amount of current flowing through the motor and the present vehicle speed. The control circuitry's responsiveness to the vehicle speed permits the amount of power steering assist boost to be adjusted indirectly in proportion to the speed. In this manner, oversteering is prevented at higher speeds where less power assistance is required, and a better road feel is obtained. Alternatively, the amount and profile of the boost can be pre-selected as a function of other parameters or by choice of the driver.

The control circuit also includes circuit monitors which operate to detect circuit malfunctions and prevent the malfunctions from affecting the driver's control of the vehicle. In the preferred embodiment, this is accomplished by removing power from the motor when a malfunction is detected.

These and further objects and advantages of the invention will be apparent from a reading of the detailed description of the invention in conjunction with the accompanying drawings.

DETAILED DESCRIPTION OF THE INVENTION

Figure 1:
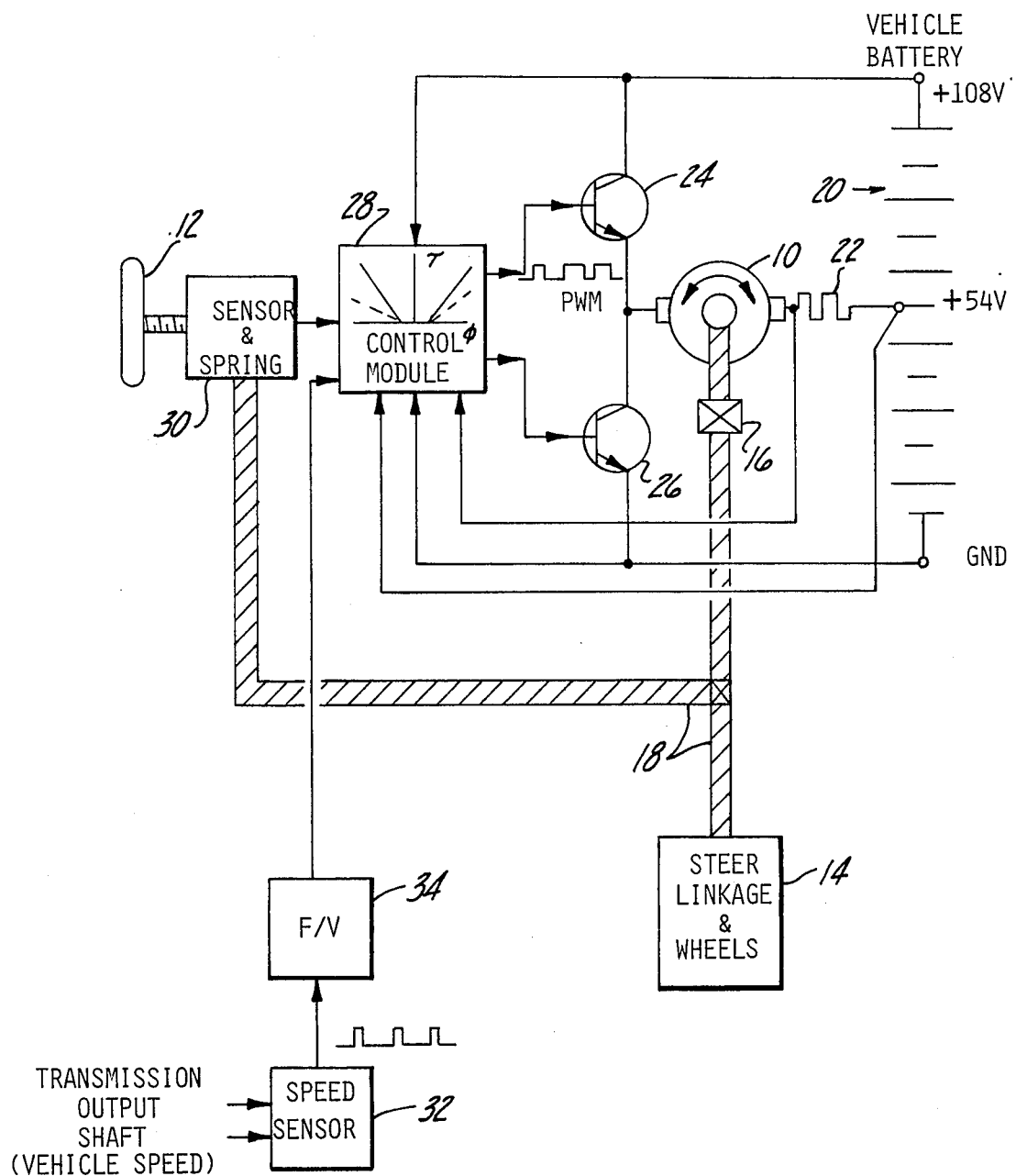
FIG. 1 is a block diagram of the motor and control circuitry of the present invention.

Referring to FIG. 1, a block diagram of the power steering system of the present invention is illustrated. A permanent magnet electric motor 10 is mechanically connected between the vehicle steering wheel 12 and the steering linkage and wheels 14. Although a permanent magnet dc electric motor is used in the preferred embodiment, it wll be apparent to those skilled in the art that any bidirectional electric motor may be used in its place. A gear reduction unit 16 is placed between the motor 10 and the point of connection to the steering shaft 18 to increase the torque output from the motor. Examples of the mechanical connection between the steering wheel 12, the motor 10 and the steering linkage 14 which may be used with the present invention are illustrated and described in copending patent applications entitled "Fail-Safe Clutch Mechanism For Electric Power Steering System" and "Improved Fail-Safe Device For An Electrical Power Assisted Steering System Including An In-Line Clutch Mechanism" filed on the same date and assigned to the same assignee as the present invention.

A battery 20 is provided as a power source for motor 10. In the preferred embodiment, battery 20 is a 108 VDC vehicle traction battery. The battery is center tapped at 54 V and is connected through current sensor 22 to one terminal of motor 10. The other terminal of motor 10 is connected, via switching transistors 24 and 26, to the high voltage and ground terminals of the vehicle battery 20, respectively.

In operation, to drive the motor 10 in a desired direction, one of switching transistors 24 or 26 is energized to permit current to flow through the motor in the desired direction. The operation of switching transistors 24 and 26 is controlled by control module 28. The control module 28, in response to various inputs, generates a pulse width modulated signal to a selected one of the two switching transistors to energize the transistors and permit current to flow through the motor 10 in the desired direction. Control module 28 receives input from a steering sensor and spring 30 which provides a signal proportional to the displacement of and the direction in which the steering wheel 12 is turned. The control module 28 also receives input from a speed sensor 32 which may be connected, for example, to the speedometer input. The sensor generates a series of spaced pulses proportional to the vehicle speed. At high vehicle speeds, the pulses are closely spaced, whereas, at low vehicle speeds, the pulses are spaced further apart. The output of speed sensor 32 is converted to an analog signal by frequency-to-voltage converter 34.

The control module 28 receives further input from the current sensor 22. This input is used by a current feedback circuit, described below, to provide precise control of motor current and torque. Finally, control module 28 receives feedback from switching transistors 24 and 26 for use by a failsafe circuit to determine whether the motor 10 is operating properly.

The control module 28 generates a pulse width modulated signal to control the operation of motor 10 as a function of the displacement of steering wheel 12, the speed of the vehicle, and the current flowing through motor 10. The graph shown in control module 28 illustrates the amount of boost ($\tau$) that will be required from motor 10 as a function of the displacement ($\theta$) of steering wheel 12. The solid diagonal lines on the left and right of center represent the maximum boost that will be provided as the steering wheel is turned left or right, respectively, i.e. when the vehicle is stationary. The dotted lines represent the lower maximum boost that will be provided for a given steering wheel displacement, i.e. when the vehicle is traveling at or about a predetermined maximum speed. It can be seen, then, that the boost provided by the power assist system varies directly in proportion to the displacement of the steering wheel 12 and inversely in proportion to the speed of the vehicle and the sensed current flow through the motor 10. A small dead band is provided at the zero steering input position to ensure that the boost motor does not begin to turn unless a definite driver input is received.

Figure 2:
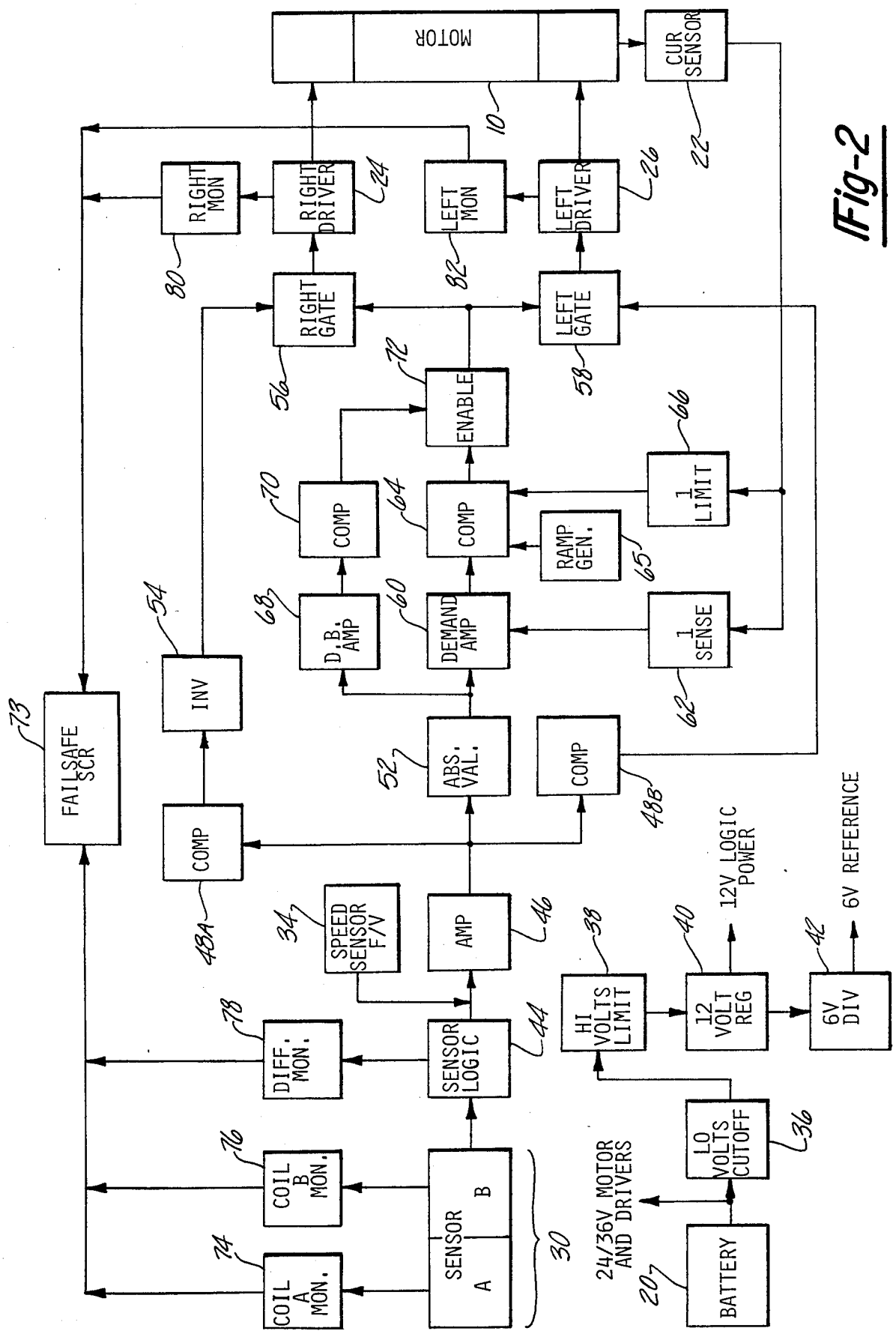
FIG. 2 is a block diagram of the control circuit of the present invention.

Referring now to FIG. 2, the electrical components of the power steering system of the present invention are illustrated in greater detail. Looking first at the power supply for the control module circuitry, battery 20 provides the voltage necessary to run the motor and the electronics in the control module 28. Output from the battery 20 is connected directly to the motor and drivers (transistors 24 and 26) as illustrated in FIG. 1. Battery power is also supplied to the control circuitry by first connecting the output of the battery to a low voltage cutoff 36, then to a high voltage limiter 38. The low voltage cutoff 36 operates to disable the control circuitry, and thus the power assist system, in the event the battery voltage is below the minimum necessary for reliable operation of the circuitry. High voltage limiter 38 protects against power surges which may occur. The output of the high voltage limiter 38 passes through a 12 V regulator 40 which generates a 12 V output for the logic circuitry. Output from the 12 V regulator also passes through a divider 42 which supplies the circuitry with a 6 V reference. Although a preferred embodiment is disclosed, the power supply may be of any conventional type well known to those skilled in the art.

The power supply provides power for the remainder of the control circuitry. Sensor 30, which receives input from steering wheel 12 (FIG. 1), includes two sensing circuits, A and B, for sensing left or right movement the steering wheel 12. Sensor 30 may be any type of conventional steering sensor, but is preferably similar to the one shown and described in our U.S. patent application Ser. No. 520,358 filed Aug. 4, 1983, assigned to the same assignee as the present invention. The sensor includes two coils, A and B, in tuned circuits which change their loading and phase shift in proportion to the displacement as the steering wheel is turned left or right. Output from the tuned circuits of sensor 30 is received by sensor logic circuitry 44, which differentially converts the phase shift variations of the tuned circuits into an analog voltage directly proportional to the direction and distance steering wheel 12 is turned. For simplicity, the voltage output of sensor logic 44 is between 0 and 12 volts. If the steering wheel 12 is not turned, the output of sensor logic 44 is about 6 volts. As the steering wheel is turned, the voltage output from sensor logic 44 increases or decreases, depending on which direction the steering wheel is turned.

The signal from sensor logic 44 is amplified by amplifier circuit 46. Output from the speed sensor frequency-to-voltage converter 34 is also supplied to amplier 46 where it is combined with the steering signal output from sensor logic 44 to produce a modified steering signal, the voltage of which is inversely proportional to the present speed of the vehicle and directly proportional to the displacement of the steering wheel. The modified steering signal is then fed to comparators 48A and 48B and to absolute value circuit 52. Comparators 48A and 48B simply determine whether the signal is above or below 6 volts so that the motor can be energized to turn in the proper direction. If the signal from sensor logic circuit 44 is below 6 volts, the signal is passed through inverter 54 to energize right gate 56 as described below. If the signal from sensor logic circuit 44 is above 6 volts, comparator 48B passes the signal directly to left gate 58 to activate that gate. Comparator 48A will not pass a signal when the modified steering signal is above 6 volts, and, likewise, comparator 48B will not pass a signal when the modified steering signal is below 6 volts.

The amplified signal from sensor logic circuit 44 is also delivered to absolute value circuit 52. This circuit operates on the modified steering signal if it is below 6 volts, but has no effect on the signal if it is above that level. If the modified steering signal is below 6 volts, the difference between that voltage and 12 volts is passed through to the next stage. As a result, after passing through the absolute value circuit 52, the steering signal will always be above 6 volts by an amount directly proportional to the steering wheel displacement and indirectly proportional to the speed of the vehicle.

The output from absolute value circuit 52 is then operated on in a series of steps to form a pulse width modulated (PWM) signal to drive the motor 10. The pulse width modulated signal is generated as a function of the modified steering signal. It is also generated as a function of the amount of current flowing through the motor 10.

To produce the PWM signal, the output of absolute value circuit 52 is delivered to demand amplifier 60. Demand amplifier 60 combines the modified steering signal with a signal representing the sensed current flow through the motor as developed in current sensor circuitry 62. As the current through the motor increases, the drive signal required to drive the motor is reduced. Thus, by combining the sensed current with the modified steering signal in the demand amplifier 60, the PWM signal can be modified according to the present requirements of the motor 10.

The signal which emerges from the demand amplifier 60 is a voltage proportinal the amount of boost required from the motor under present operating conditions. This voltage is then converted to a PWM signal in comparator 64. The PWM signal is produced using conventional techniques. A ramp generator 65, generates a sawtooth waveform which is received by comparator 64. Comparator 64 outputs a positive voltage of predetermined value whenever the voltage from the ramp generator 65 is less than the voltage received from demand amplifier 60. When the voltage from the ramp generator is greater than the voltage from demand amplifier 60, comparator 64 generates zero voltage. Thus, during the portions of each sawtooth wave where the voltage of demand amplifier 60 is greater than the sawtooth wave voltage, a positive signal is generated by comparator 64. During those portions of the sawtooth wave where the sawtooth wave voltage is greater than the output of demand amplifier 60, no voltage is generated. The result is a square wave signal in which the width of the pulses is proportional to the voltage generated by demand amplifier 60.

The ramp generator 65 is adjusted so that, under normal operation, the sawtooth wave voltage at its peak, is always greater than the maximum possible output voltage of demand amplifier 60. Thus, the maximum duty cycle of the pulse width modulated signal generated by comparator 64 is always less than 100%. In the preferred embodiment, the maximum duty cycle is approximately 95%. As described below, this fact can be used to detect malfunctions of certain portions of the control circuit.

Under certain circumstances, in particular when the driver turns the steering wheel hard in one direction, the motor 10 may be driven to its limit. Under these conditions, the PWM signal generated by comparator 64 should be temporarily stopped to prevent overloading of the motor. To accomplish this result, current limiting circuit 66 receives a signal from current sensor 22 proportional to the current flowing through the motor 10. When the motor is being driven at its maximum, current limiter 66 generates an override signal to comparator 64. This signal disables the comparator 64. In the preferred embodiment, the override signal from current limiter 66 is a fixed positive voltage which is greater than the voltage out of demand amplifier 60 when motor current exceeds a preset limit. Since comparator 64 generates a positive pulse only when the demand amplifier output is greater than the inputs from the ramp generator 65 and current limiter 66, the pulse width is reduced to that necessary to provide the maximum allowable motor current. Thus, whenever the motor is driven at its maximum, the PWM signal is limited on a cycle by cycle basis.

The modified steering signal output of the absolute value circuit 52 is also delivered to deadband amplifier 68. Deadband amplifier 68 and comparator 70 effectively create a minimum threshold of operation for the power assist circuitry. Deadband amplifier 68 amplifies the signal and delivers it to comparator 70. Comparator 70 compares the amplified signal with a predetermined reference voltage and generates an enable signal whenever the amplified signal is greater than the reference signal. An enable circuit 72 receives the pulse width modulated signal from comparator 64 and, if present, the enable signal from comparator 70. If both signals are present, the PWM signal is delivered to right gate 56 and left gate 58. If the enable signal is not present, enable circuit 72 will not pass the PWM signal from comparator 64. In instances where the power steering demand signal is very small, the output from deadband amplifier 68 will be less than the reference voltage and no enable signal will be generated. This prevents propagation of the PWM signal to the drivers 24 and 26 and effectively shuts off the power assist motor 10. Thus, for very small steering demands, the vehicle is steered without the assistance of the power steering motor.

When enable gate 72 passes the PWM signal, it is received by both right gate 56 and left gate 58. However, as described earlier, only one of the two gates is activated depending whether the modified steering signal from amplifier 46 is above or below 6 volts. If the steering wheel is turned to the right, the output from amplifier 46 is below 6 volts and right gate 56 is activated via comparator 48A and inverter 54. The pulse width modulated signal will pass through right gate 56 to right driver 24 to drive motor 10 to the right. If the steering wheel is turned to the left, gate 58 is activated by a signal passed through comparator 48B and the pulse width modulated signal is delivered through left gate 58 to driver 26 to cause the steering motor 10 to turn left.

The motor 10 is driven during the positive voltage portions of each pulse. Thus, when the pulse width modulated signal is composed of relatively short positive voltage segments and relative long zero voltage segments, the steering demand is low and the motor 10 turns with a low level of torque in the desired direction, Similarly, when each pulse is composed primarily of a long, positive voltage portion and a relatively short zero voltage portion, the steering demand is great and the motor turns with a high level of output torque. The overall effect is that the motor 10 turns in response to the steering demand which is delivered to the motor driving transistors in the form of a pulse width modulated signal. The width of the pulses varies with the displacement of the steering wheel 12, the vehicle speed and the amount of current flowing through the motor 10.

The power assist control circuitry also includes a failsafe circuit which shuts off the motor in the event of a component failure. To safeguard the system, various monitor circuits are placed throughout the system and connected to a failsafe SCR 73. In the event even one component of the system malfunctions, failsafe SCR 73 is triggered, disconnecting the motor 10 from the battery 20.

The monitoring circuits include coil A monitor 74 and coil B monitor 76. These circuits monitor the operation of the sensor coils and generate an error signal when either coil fails to oscillate within the defined normal frequency range. Also included is a differential monitor 78 which monitors the output of sensor logic circuit 44 and generates an error signal whenever a malfunction is detected in the circuitry which converts the oscillations of the tuned circuits of sensor 30 into a voltage. Finally, circuitry is provided to monitor the operation of driver circuits 24 and 26. These circuits are right monitor 80 and left monitor 82. Monitors 80 and 82 check the duty cycle of the pulse width modulated signal delivered to drivers 24 and 26. If the duty cycle is greater than the predefined maximum duty cycle, 95% in the preferred embodiment, an error signal is generated by one of the monitor circuits 80 or 82.

Whenever an error signal is generated by any of the monitoring circuits 74 to 82, failsafe SCR 73 is energized shutting off motor 10. Consequently, any malfunction of the power assist control circuitry results in a shutdown of the power assist motor so that the motor will not operate out of the control of the driver. In the event of a steering motor shutdown, the operator retains direct steering control over the vehicle because steering wheel 12 remains connected directly to steering linkage and wheels 14 via steering shaft 18. The only noticable effect of a motor shutdown is the loss of power boost. Otherwise, steering control of the vehicle is not impaired.

Figure 3A:
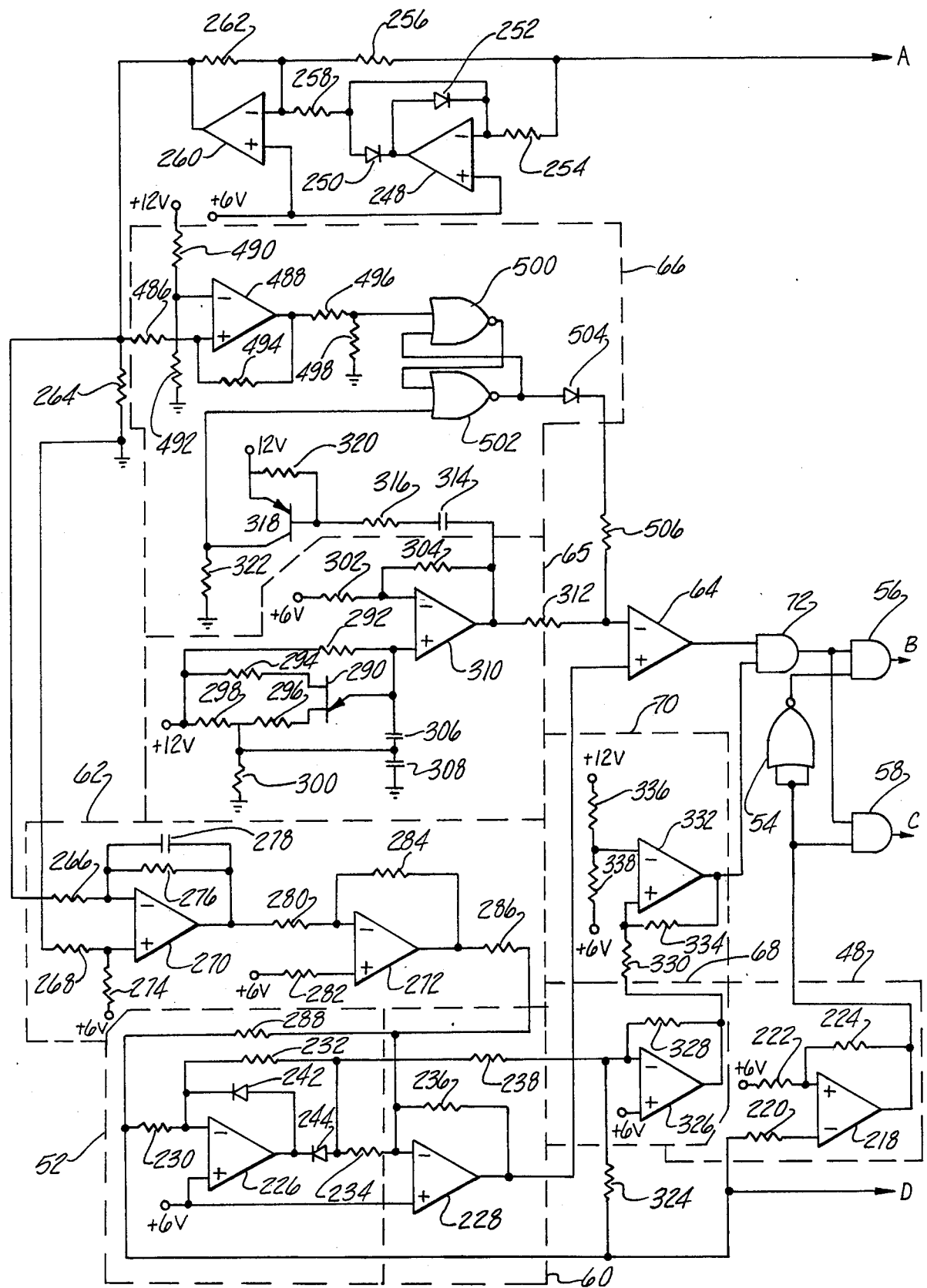
FIG. 3a is a schematic diagram of the feedback circuit and pulse width modulator circuitry of the control circuit.
Figure 3B:
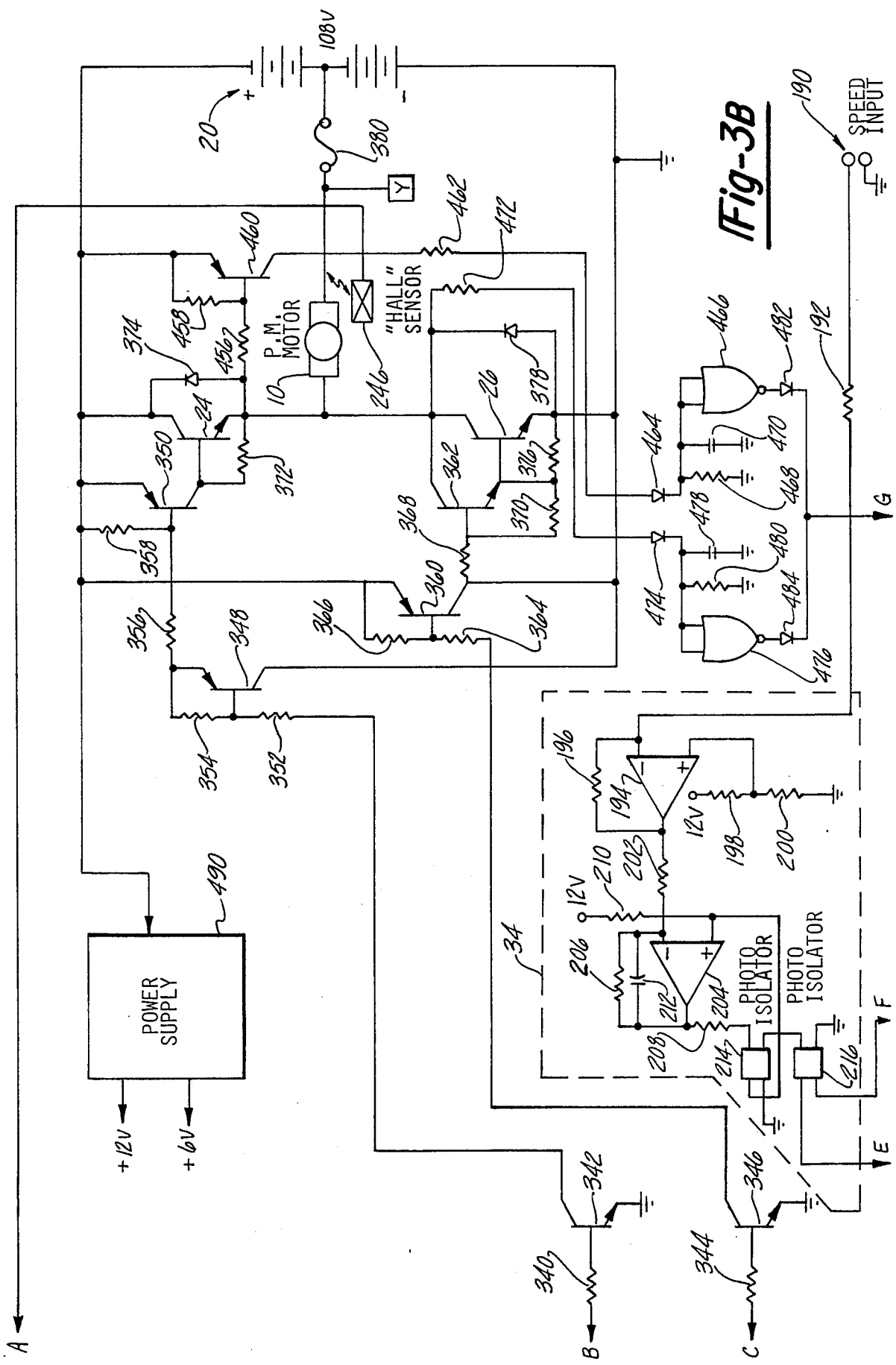
FIG. 3b is a schematic diagram of the amplifier and driver circuitry and the failsafe circuitry of the control circuit.
Figure 3C:
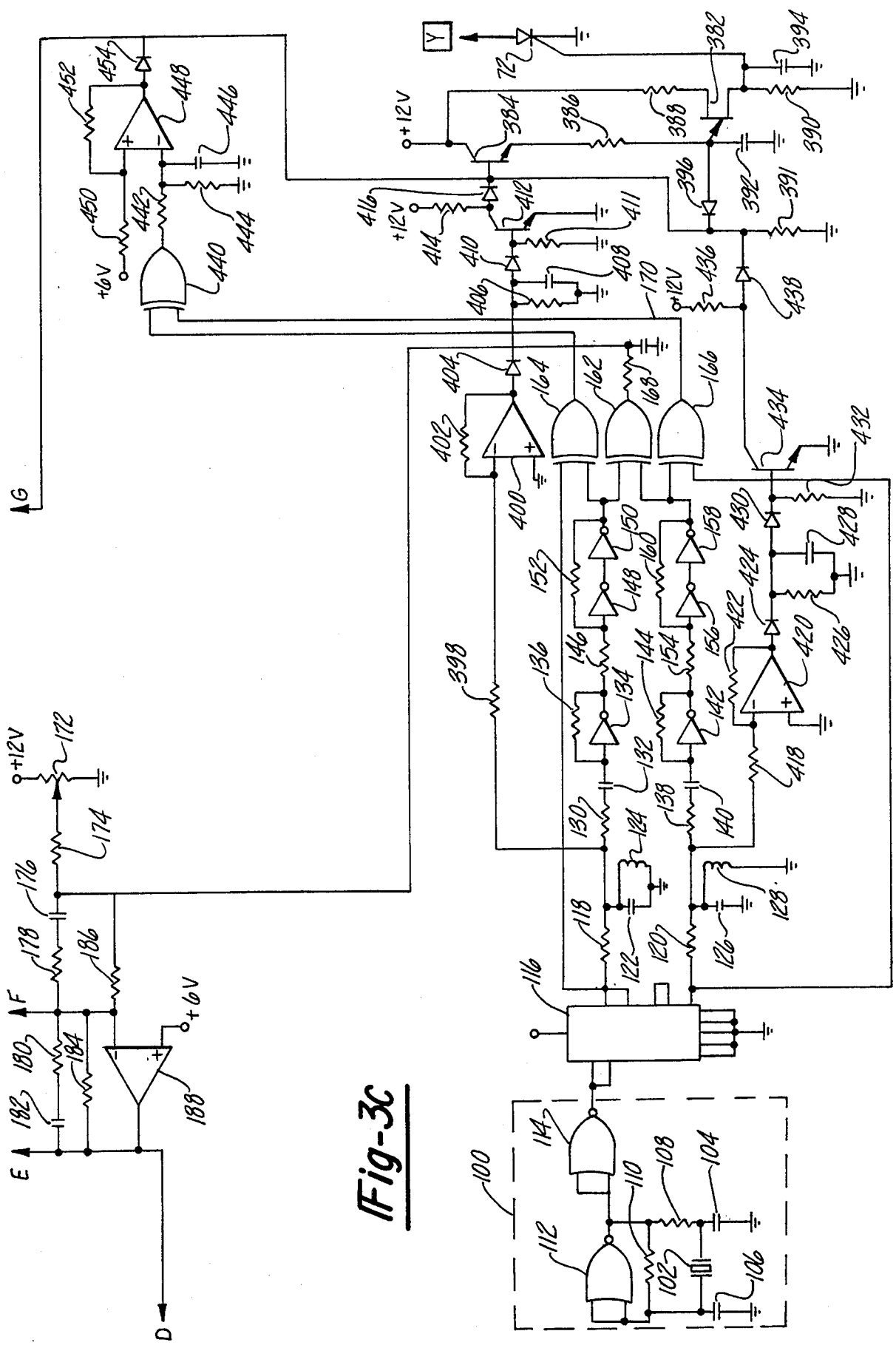
FIG. 3c is a schematic diagram of the steering torque sensor circuitry.

Turning now to FIGS. 3A, 3B, and 3C, the details of the control circuitry illustrated in FIG. 2 will be described. In FIG. 3C, high frequency oscillator 100 provides an AC signal to excite the coils 124 and 128 (A and B in FIG. 2) of sensor 30. The oscillator 100 comprises crystal 102 which has a natural resonant frequency of 445 KHz. One end of crystal 102 is connected to capacitor 104 which is connected to ground. The other end of crystal 102 is connected to capacitor 106 which is also connected to ground. The first end of crystal 102 is also coupled to resistor 108, which is in turn connected to resistor 110. Crystal 102, capacitors 104 and 106, and resistors 108 and 110 form the resonator of the oscillator 100. The other end of resistor 110 is connected to both inputs of a 2-input NOR gate 112. The point of common juncture of resistors 108 and 110 is connected to the output of NOR gate 112 which is in turn connected to both inputs to 2-input NOR gate 114. NOR gates 112 and 114 operate to shape the waveform generated by the resonator. Thus, the output of oscillator 100 is an approximately 455 KHz square wave.

The output of oscillator 100 is delivered to flipflop 116 which produces two square wave signals which are 90° out of phase. Flipflop 116 also serves to divide the frequency of the signal from oscillator 100 by four. The resulting output of flipflop 116 is a pair of 113 KHz square wave signals emanating 90° out of phase. The outputs of flipflop 116 pass through current limiting resistors 118 and 120 and feed the points of common connection between a capacitor 122 and an inductor 124, and a capacitor 126 and an inductor 128, respectively. Capacitor 122 and coil 124 form a tank circuit having a sine wave output. Likewise, capacitor 126 and coil 128 form a second independent tank circuit having a sine wave output. The resonant frequency of the tank circuits is selected to be at or near the 113 KHz signal generated by flipflop 116. The tuning of the tank circuits is mechanically adjusted as the steering wheel 12 (FIG. 1) is turned. Consequently, the sine wave outputs from the tank circuits are changed in response to steering commands from the driver. This is described more fully in our copending application Ser. No. 520,358.

The output of the tank circuit associated with resistor 118 is passed to a first amplifying circuit composed of resistor 130, capacitor 132, inverter 134 and resistor 136. Likewise, the output of the tank circuit associated with resistor 120 is passed to a second amplifying circuit consisting of resistor 138, capacitor 140, inverter 142 and resistor 144. The outputs of the tank circuits are also delivered to coil monitors as will be described more fully below.

The output of the first amplifying circuit is delivered through a first pulse shaping circuit consisting of resistor 146, inverters 148 and 150, and resistor 152. The output of the second amplifying circuit is delivered to a second pulse shaping circuit consisting of resistor 154, inverters 156 and 158, and resistor 160.

The output of the first pulse shaping circuit is delivered to a first input 2-input exclusive OR gate 162 and to 2-input exclusive OR gate 164 which forms a part of the differential monitor circuit. The output of the second pulse shaping circuit is delivered to the second input of exclusive OR gate 162 and also to 2-input exclusive OR gate 166 which is also a part of the differential monitor circuit.

The amplifying and pulse shaping circuits which receive the sine wave signals from the tank circuits are employed to compare the phase relationship (zero-crossing) of signals from the tank circuits. The gain of the first and second amplifier circuits is relatively large and will cause the signal to saturate, resulting in a square wave output from each. These square wave outputs are further shaped by the first and second pulse shaping circuit.

Exclusive OR gate 162 will generate an output when and only when there is a difference between the two signals at its two inputs. As a result, the output of gate 162 is a pulse whose width is modulated by the amount of phase shift between the outputs of the first and second pulse shaping circuits. These pulses can be from very low to almost 100% duty cycle. For example, at the steering wheel's nominal center position, a 50% duty cycle is realized that can be established as a norm for the steering center and, as the steering wheel is turned to the right or left, the duty cycle will become less or more, which can be subsequently recognized as a demand for left steer or right steer.

The output of gate 162 represents a torque demand steering signal and is passed through a filter, composed of resistor 168 and capacitor 170, to produce a dc voltage level. The filter has an output which is an average dc voltage of the pulse width modulated signal generated by gate 162. If the pulses coming from gate 162 become longer, the voltage level increases. If the pulses become shorter, the voltage level decreases.

The torque demand steering signal is next amplified and combined with an input representing the vehicle speed. The amplifier circuit comprises potentiometer 172 which is connected between 12 volts and ground, resistor 174, capacitor 176, resistor 178, resistor 180, capacitor 182, resistor 184, resistor 186, and operational amplifier 188. The output of the sensor logic circuit ranges in voltage between zero and +12 volts dc, as described earlier. The nominal voltage, when the steering wheel is centered, is approximately 6 volts dc. When the steering wheel is turned, the voltage received by amplifier 188 rises or falls accordingly.

The amplifier stage also receives an input from the speed sensing circuit (FIG. 3B) of the vehicle. A speed input is received from the vehicle speedometer at 190. As described earlier, the incoming signal is a pulse train with pulses spaced in proportion to the vehicle speed. When the vehicle is traveling slowly, the pulses are spaced relatively far apart. When the vehicle is traveling quickly, the pulses are spaced relatively close together. The pulse train input from the speedometer at 190 is applied, through resistor 192, to a frequency to voltage convertor 34. The signal is first amplified in a stage comprising operational amplifier 194 and resistors 196, 198, and 200. The output of the amplification stage is then delivered, via resistor 202 to an integrator comprising operational amplifier 204, resistors 206, 208 and 210 and capacitor 212. The output of the integrator is a voltage proportional to the vehicle speed. The greater the vehicle's speed, the greater the voltage output of the integrator.

The voltage output of the integrator is then processed through a slaved pair of photo isolators 214 and 216. Photo isolator 214 is driven by the voltage output of the integrator and it, in turn, drives photo isolator 216. Isolator 214 also provides feedback to operational amplifier 204 of the integrating circuit and serves to regulate the output of that circuit. Photo isolator 216 is coupled to the feedback loop across the amplifier 188. Photo isolator 216 serves to decrease the effective resistance of resistor 180 as the voltage from the speed detection circuit increases. Consequently, as the vehicle speed increases, the gain produced by the amplifier 188 is reduced. The reduced gain from amplifier 188 results in a reduction in the amount of power steering boost at higher vehicle speeds.

Turning now to FIG. 3A the output from amplifier 188 is delivered to absolute value circuit 52, to comparator circuit 48 and to deadband amplifier 68. Comparator circuit 48 comprises operational amplifier 218 and associated resistors 220, 222, and 224. The output of operational amplifier 218 is about 12 volts if the steering wheel has been turned to the left, i.e. if the voltage from amplifier 46 is greater than 6 volts, or about zero volts if the steering wheel was turned to the left, i.e. if the voltage from amplifier 46 is less than 6 volts. The output from comparator 48 is delivered to left gate 58 and, through inverter 54, to right gate 56. Right and left gates 56 and 58 are two-input AND gates which receive inputs from operational amplifier 218 and from enable gate 72. Inverter 54 is a 2-input NOR gate with both inputs tied to the output of operational amplifier 218. The operation of gates 56 and 58, and of enable gate 72 will be described in more detail below.

Absolute value circuit 52 includes a pair of operational amplifiers 226 and 228 as well as resistors 230 and 232 and diodes 242 and 244. As described earlier, the absolute value circuit 52 operates on the amplified signal from amplifier 188 by transforming any voltage below 6 volts voltage into a corresponding voltage greater than 6 volts. For example, if the modified steering signal from amplifier 188 is 2 volts, the output from absolute value circuit 52 will be a 10 volts. If the modified steering signal from amplifier 188 is greater than 6 volts, it passes virtually unchanged through the absolute value circuitry.

The signal from absolute value circuit 52 is delivered to demand amplifier circuit 60 via resistor 234. Demand amplifier circuit 60 includes operational amplifier 228, resistor 236 and resistor 238. The demand amplifier 60 amplifies the output of absolute value circuit 52 for use by later stages.

The absolute value circuit 52 and the demand amplifier circuit 60 also receive input from the current sensing circuit 62. A Hall sensor 246 (FIG. 3B) senses the current flow through the motor 10. A signal proportional to the sensed current is delivered to an absolute value circuit comprising operational amplifier 248, diodes 250 and 252, and resistors 254 and 256. The absolute value of the sensed current signal then passes through resistor 258 to an amplifier stage comprising operational amplifier 260 and feedback resistor 262. The Hall sensor, the absolute value circuit and the amplifier 260 comprise the current sensing circuit 22 (FIG. 2).

The sensed current signal is passed via resistors 264, 266 and 268 to operational amplifier 270 in sensing circuit 62. Operational amplifier 270 acts as an integrator in conjunction with resistors 274, 276 and capacitor 278. This effectively produces a time weighted voltage which represents the average value of the current flow through the motor. This time weighted value is then amplified by operational amplifier 272 in conjunction with resistors 280, 282, 284 and 286.

The amplified sensed current signal from sensing circuit 62 is then provided to the inverting input of operational amplifier 228 of demand amplifier 60 and, via resistors 230 and 232, to the inverting input to operational amplifier 226 of the absolute value circuit 52. The absolute value circuit 52 and the demand amplifier circuit 60 combine the sensed current signal with the modified steering signal to produce a torque demand signal representative of the amount of power steering boost required under present operating conditions. The amount of boost required is a function of the displacement of the steering wheel, the vehicle speed, and the sensed current through the motor 10.

The torque demand signal from operation amplifier 228 is delivered to the noninverting input of comparator 64. The comparator 64 also receives a ramp signal at its inverting input and produces a pulse width modulated signal at its output. The ramp generator 65 generates a sawtooth signal for comparison with the voltage level of the torque demand signal. To generate the ramp signal, SCR 290 is placed in an oscillating circuit with a nominal frequency of 330 Hz. The oscillating circuit includes resistors 292, 294, 296, 298, and 300 and capacitors 306 and 308. The output of the oscillating circuit is a sawtooth wave. The sawtooth wave output is amplified to a predetermined level by operational amplifier 310 in conjunction with resistors 302 and 304. The sawtooth output of operational amplifier 310 passes through resistor 312 to the inverting input of comparator 64.

As described earlier in conjunction with FIG. 2, comparator 64 generates a pulse width modulated signal, the width of each pulse being proportional to the torque demand signal generated by demand amplifier 60. Operational amplifier 64 generates a positive voltage whenever the signal at its noninverting input is greater than the signal at the inverting input. Since the signal at the inverting input is a sawtooth, the torque demand signal at the noninverting input will be greater than the signal at the inverting input for some portion of each sawtooth and less than the signal at the inverting input for the remainder of each sawtooth. The result is a PWM signal. The output of comparator 64 is used as one of the inputs to AND gate 72 which forms the enable gate. The other input of AND gate 72 comes from a signal generated by deadband amplifier 68 and comparator 70. Deadband amplifier 68 receives the modified steering signal via resistor 324. The deadband amplifier comprises operational amplifier 326 and resistor 328. The amplified signal from deadband amplifier 68 is delivered, via resistor 330 to comparator circuit 70 comprising operational amplifier 332 and resistor 334. A reference voltage is supplied to amplifier 332 by voltage dividing resistors 336 and 338 connected between 12 volts and 6 volts on the power supply. The junction of resistors 336 and 338 forms the inverting input to amplifier 332. Comparator 70 compares the amplified demand signal from deadband amplifier 68 with the reference voltage to turn off the power assist circuitry when the required boost is below a minimum threshold level. This threshold is determined by the selection of resistors 336 and 338. If the modified steering signal is above the threshold, amplifier 332 generates a positive voltage as an input to AND gate 72. When the demand signal is less than the minimum threshold, no output is generated by amplifier 332, and a zero is received at the input to AND gate 72. When amplifier 332 generates no output, gate 72 is effectively turned off and any PWM signal generated by comparator 64 is prevented from reaching later stages.

Assuming that the modified steering signal is above the threshold level, the PWM signal from comparator 64 is passed through gate 72 to one of the inputs to each of AND gates 56 and 58 which form the right and left gates illustrated in FIG. 2. As described above, one of the two gates 56 or 58 will be selected by the output from comparator 48. Thus, only one of the two gates 56 or 58 will pass the PWM signal on to the later stages.

Referring again to FIG. 3B, the amplification and driver circuit for the motor are illustrated. If the right gate is selected, output from gate 56 is delivered through resistor 340 to the base of NPN transistor 342. Similarly, if the left gate is selected, the output from gate 58 passes through resistor 344 to the base of NPN transistor 346. Transistors 342 and 346 activate the amplification circuits in response to the pulse width modulated signal. The right amplification circuit includes PNP transistors 348 and 350 and resistors 352, 354, 356 and 358. The left amplification circuit includes PNP transistors 360, NPN transistor 362 and resistors 364, 366, 368 and 370. The amplification circuits amplify the pulse width modulated signal before the signal is delivered to the right and left driver transistors 24 and 26, respectively. In conjunction with the right and left drivers are resistors 372 and 376 and diodes 374 and 378, respectively.

In operation, when the right gate 56 is selected, a pulse from the pulse width modulator 64 passes through enable gate 72 and gate 56 to the right amplifiers and drivers. The positive portion of each pulse turns on transistor 342 which, in turn, activates transistors 348 and 350. Activation of transistor 350 causes right driver transistor 24 to turn on creating a current loop from the positive side of battery 20, through transistor 24 and through the motor 10, back to the center tap of the battery through fuse 380. This circuit connection causes the motor to drive the steered wheel of the vehicle to the right at a rate determined by the driver's input.

Similarly, when the left amplifier and driver is activated by the PWM signal, transistor 346 turns on during the high voltage portion of each pulse causing transistors 360 and 362 to be activated. Activation of transistor 362 causes left driver 26 to turn on completing the circuit from the center tap of the battery through the fuse 380 and the motor 10, the transistor 26 to ground. In this instance, the motor turns to turn the steered wheel to the left in response to the driver's input.

During the positive voltage portion of each pulse in the PWM signal, a selected one of the two drive transistors 24 or 26 is turned on to allow current to flow in the desired direction through the motor 10. During the zero voltage portions of the PWM signal, the drive transistors are turned off and no current flows through motor 10. By varying the width of the pulses in the PWM signal, the motor is driven to a greater or lesser extent. Since the width of the pulses is a function of the displacement of the steering wheel 12, the vehicle speed and the current flowing through the motor, the amount of power assistance provided by the motor 10 is a function of those parameters, also.

As noted in the discussion of the block diagram of FIG. 2, the power assist circuitry also includes monitoring circuits to detect malfunctions of the power assist circuitry. All the monitors are connected to a fuse-blowing circuit (FIG. 3C) which includes failsafe SCR 73 which, in turn, is connected, at label Y, to one end of fuse 380. SCR 73 is controlled by UJT 382 which, in turn, is controlled by transistor 384. Associated with the control transistors are resistors 386, 388, 390, and 391, capacitors 392 and 394 and diode 396. When a malfunction is detected by any of the circuit monitors, an error signal, in the form of a positive voltage, is applied to the base of transistor 384. This in turn activates UJT 382 which activates SCR 73. Activation of SCR 73 causes current to flow from the center tap of the battery directly to ground through fuse 380 and SCR 73. The resulting high current blows fuse 380, breaking the circuit between the motor 10 and the battery 20. Alternatively, a circuit breaker could be used in place of fuse 380.

Various circuit monitors are included in the system. A pair of coil monitors (FIG. 3C) monitor the sign wave outputs from the tank circuits associated with resistors 118 and 120. The coil A monitor, which monitors the output of the tank circuit associated with resistor 118, includes current limiting resistor 398, an amplifier consisting of operational amplifier 400 and resistor 402, a low pass filter consisting of diode 404, resistor 406, capacitor 408, and diode 410, and an error signal switch including resistor 411 and transistor 412. Under proper operating conditions, the sign wave signal from the tank circuit of capacitor 122 and coil 124 will pass through resistor 398 and will be amplified by operational amplifier 400. However, since the sign wave is at a relatively high frequency, the signal will be removed by the low pass filter leaving only a DC voltage to be applied to the base of transistor 412. Transistor 412 is thereby held on under normal conditions shunting the 12 volt signal through resistor 414 to ground. If the coil malfunctions, however, no signal will be received from the output of the tank circuit. In that case, no voltage will be applied to the base of transistor 412. Transistor 412 will turn off allowing the 12 volt error signal to pass through resistor 414 and diode 416 to the base of transistor 384.

The monitor for coil B operates the same manner. The signal from the tank circuit of coil B passes through resistor 418 to an amplifier comprising operational amplifier 420 and resistor 422, through a low pass filter comprising diode 424, resistor 426, capacitor 428, diode 430 and resistor 432 to the base of transistor 434. When coil B is operating properly, the base of transistor 434 receives a positive voltage keeping the transistor on and routing the 12 volt signal through resistor 436 to ground. When coil B malfunctions, the base of transistor 434 does not receive enough voltage to keep the transistor turned on and the 12 volt signal passes through resistor 436 and diode 438 to the base of transistor 384. Thus, when either of coils A or B malfunctions, an error signal is delivered to the base of transistor 384 which, as described above, results in the blowing of fuse 380.

The power assist circuitry also includes a differential monitor (FIG. 3C) which monitors the operation of the sensor logic circuit. The differential monitor includes exclusive OR gates 164 and 166 which receive the pulse width modulated signal from the pulse shaping circuits (NOR gates 148, 150 and 156, 158) of the sensor logic circuit. Exclusive OR gates 164 and 166 also receive an input from the square wave output of flipflop 116. The exclusive OR gates 164 and 166 will generate a positive voltage whenever one of their inputs is low and the other is high. If both inputs to the exclusive OR gate are low or both are high no output will be generated by the gate.

Under normal operating conditions, the input to exclusive OR gate 164 from flipflop 116 will be in phase with the output from the pulse shaper NOR gates 148 and 150. Thus, under normal conditions, the inputs to exclusive OR gate 164 will be both low or both high at the same time. As a result a no output will be generated by gate 164. Likewise, the input from flipflop 116 to exclusive OR gate 166 will be in phase with the input from pulse shaper NOR gates 156 and 158. Consequently, the output of exclusive OR gate 166 will, under normal conditions, be a zero voltage.

The outputs from exclusive OR gates 164 and 166 are delivered to an input of exclusive OR gate 440. As noted, under normal conditions, both inputs to gate 440 will be low and thus, exclusive OR gate 440 will not generate an output. However, if either half of the sensor logic circuit malfunctions, the output of one of the exclusive OR gates 164 or 166 will go high delivering a high input to exclusive OR gate 440. The result will be a positive voltage output from exclusive OR gate 440. In the event both sensor logic circuits malfunction, the outputs from both exclusive OR gates 164 and 166 will go high, but they will be 90° out of phase with one another and thus, the inputs to exclusive OR gate 440 will be out of phase and the output from gate 440 will still be a positive voltage.

The result of a malfunction in the sensor logic circuit is a positive voltage output from exclusive OR gate 440. That output is delivered through resistor 442 and low pass filter consisting of resistor 444 and capacitor 446 to amplifier 448 comprising operational amplifier 448, resistors 450 and 452. The output from amplifier 448 is passed through diode 454 as an error signal to transistor 384 resulting in the blowing of fuse 380.

The operation of the left and right driver circuits is also monitored by a left monitor and right monitor (FIG. 3B). Any pulse width modulated signal delivered to right driver 24 is also delivered to the base of a PNP transistor 460 through resistor 456. During the high portions of each pulse of the PWM signal, transistor 460 is turned on allowing current to flow through current limiting resistor 462 and diode 464 to a right driver monitor consisting of NOR gate 466, resistor 468 and capacitor 470. In a similar fashion, any PWM signal delivered to left driver 26 causes current to flow through current limiting resistor 472 and diode 474 to a left driver monitor consisting of NOR gate 476, capacitor 478 and resistor 480.

In operation, the driver monitors receive a pulse width modulated signal identical to the one delivered to right driver 24 and left driver 26. The value of capacitors 470 and 478 and resistors 468 and 480 are chosen such that the capacitors 470 and 478 charge quickly during the positive voltage portions of each pulse and discharge slowly through resistors 468 and 480 during the zero voltage portions of each pulse. As noted earlier, the ramp generator circuit 65 is designed so that, under normal operating conditions, the duty cycle of the pulse width modulated signal is never greater than about 95%. In the event of a malfunction which might result in a potential loss of steering control, the duty cycle will be greater than 95%. If this occurs, one of the capacitors 470 or 478 will charge quickly when it receives the PWM signal, but will not have enough time to discharge through resistor 468 or 480 before the next pulse comes along. Consequently, the voltage on the capacitor receiving the PWM signal will rise to a relatively high level. This causes a high input to appear at the inputs to one of the NOR gates 466 or 476. The result is an error signal output through either diode 482 or 484 to the base of transistor 384 blowing fuse 380.

A final safeguard which has been built into the system is illustrated in FIG. 3A. In order to ensure that the current through the motor does not exceed a predetermined maximum, a current limiting circuit 66 disables the pulse width modulator under conditions of maximum current flow. The amplified sensed current signal from Hall sensor 246 is received, through resistor 486, by an amplifier comprising operational amplifier 488 voltage dividing resistors 490 and 492 and feedback resistor 494. The output from the amplifier is delivered through voltage dividing resistors 496 and 498 to a latch consisting of NOR gates 500 and 502. Under normal conditions, the output of amplifier 488 is a relatively low voltage, which, when applied to the input of NOR gate 500, results in no voltage being applied through diode 504 and resistor 506 to the inverting output of comparator 64. Under conditions of maximum current, however, a positive voltage is delivered from amplifier 488 to the input of NOR gate 500 causing a positive voltage to appear at the output of the latch which is then delivered to the inverting input of comparator 64. Because NOR gates 500 and 502 are set up in a latch configuration, the output of the latch will remain high even if the output of amplifier 488 goes low again. The positive output from the latch, when added to the voltage generated by ramp circuit 65, is always greater than the torque demand signal which is received at the noninverting input to comparator 64. Consequently, no signal is generated by comparator 64.

In the illustrated embodiment, the latch is reset at the end of each sawtooth wave generated by the ramp generator. This is accomplished by applying a positive voltage to the remaining input of NOR gate 502. The sawtooth wave output from operational amplifier 310 is passed through capacitor 314 and resistor 316 to the base of PNP transistor 318. Transistor remains off during most of the sawtooth wave except at the highest voltage portion of the sawtooth. Each time the sawtooth wave reaches the highest voltage portion, transistor 318 turns on delivering a high signal the input of NOR gate 502. This resets the latch to a zero voltage output if the current through the motor has dropped below the maximum current level. If the current through the motor has not dropped below the maximum current level, the output of the latch will remain high, thus continuing to override ramp signal produced by generator 65.

It is to be understood that the invention has been described with reference to a specific embodiment which provides the features and advantages previously described, and that such specific embodiment is susceptible to modification, as will be apparent to those skilled in the art. Accordingly, the foregoing description is not to be construed in a limiting sense.

We claim:

1. An electrical power assisted steering system for a vehicle comprising:
   operator controlled means for steering the vehicle;
   a steering shaft connected between the operator controlled means and at least one steerable wheel of the vehicle;
   a voltage source having a first and second terminal, said first terminal being at a higher voltage than said second terminal, and a center tap;
   a bi-directional electrical motor having two terminals, one terminal being connected to the center tap of the voltage source, for providing additional torque to the steering shaft;
   means for coupling the motor to the steering shaft;
   sensor means for generating a signal indicative of the displacement and rotation of the operator controlled means by an operator; and
   control means for controlling the operation of the motor in response to signals from the sensor means, the control means including
   a first switching means electrically connected between the first terminal of the voltage source and the other terminal of the motor for selectively energizing the motor to turn in a first direction to thereby provide power assisted steering in said first direction,
   a second switching means electrically connected between said other terminal of the motor and the second terminal of the voltage source for selectively energizing the motor to turn in a direction opposite to said first direction to thereby provide power assisted steering in said opposite direction, and
   a means for generating pulse width modulated signals selectively to either the first or second switching means, said first and second switching means being responsive to the pulse width modulated signals to energize the motor to turn in proportion to the width of the pulse signals.

2. The electrical power assisted system of claim 1 wherein the widths of the pulses generated by the control means are a function of the displacement of the operator controlled means, the current flow through the motor, and the speed of the vehicle.

3. The electrical power assisted steering system of claim 2 wherein the control means includes monitoring means for detecting improper operation of the control means and, when improper operation is detected, for preventing the motor from providing torque to the steering shaft.

4. The electric power assisted steering system of claim 3 wherein the control means further includes means, responsive to the speed of the vehicle, for reducing the torque generated by the motor inversely in proportion to the speed of the vehicle.

5. The electrical power assisted steering system of claim 2 wherein the motor is a permanent magnet DC electric motor and the voltage source is a traction battery.

6. A control system for use with an electrical power assisted steering system including a center tapped battery having a first terminal with a voltage above the voltage at the center tap and a second tap having a voltage below the voltage at the center tap, a bi-directional electric motor having two terminals, one terminal being connected to the center tap of the battery, and an operator controlled steering mechanism coupled to the motor so that torque from the motor assists in turning the steering mechanism, the control system comprising:
   sensor means for sensing the displacement and direction of the rotation of the steering mechanism;
   first switching means electrically connected between one terminal of the battery and the first terminal of the motor to permit energization of the motor in a first direction;
   second switching means electrically connected between the other terminal of the battery and the second terminal of the motor to permit energization of the motor in a direction opposite said first direction; and
   control means responsive to the sensor means, for selectively energizing either said first switching means or said second switching means to energize the motor to turn in a direction to provide power assist to the operator, and including a means for generating a pulse width modulated signal to the selected switching means, said selected switching means operative to energize the motor to develop torque proportional to the width of the pulse signals.

7. The control system of claim 6 wherein the width of the pulse signals generated by the control means varies as a function of the displacement of the steering mechanism, the current flow through the motor, and the speed of the vehicle.

8. The control system of claim 7 wherein the control means includes a plurality of circuits and means for monitoring at least one circuit of the control means to detect a malfunction of said at least one circuit and, when a malfunction is detected, for preventing the generation of torque by the motor.

9. The control system of claim 8 wherein the control means includes means for varying the torque generated by the motor inversely in proportion to the speed of the vehicle.

10. An electrical power assisted steering system for a wheeled vehicle comprising:
operator controlled steering mechanism;
a steering shaft connected between the steering mechanism and at least one steerable wheel of the vehicle;
a battery having a first terminal at a positive voltage, a second terminal at a ground voltage, and a center tap;
a permanent magnet electric motor coupled to a steering shaft to apply torque to the steering shaft to turn the steerable wheel, the motor having two terminals, one of said terminals being electrically connected to the center tap of the battery;
a sensor mounted between the steering mechanism and the steering shaft to sense the displacement and direction of rotation of the steering mechanism and to generate signals proportional thereto;
means for sensing the speed of the vehicle;
means for sensing the current flowing through the motor;
a control circuit for generating a pulse width modulated signal, the pulse width being directly proportional to the displacement of the steering mechanism and the amount of current flowing through the motor and inversely proportional to the speed of the vehicle, said pulse width modulated signal being generated on a first output of the control circuit when the steering mechanism is turned in a first direction and a second output of the control circuit when the steering mechanism is turned in the opposite direction;
a first transistor, responsive to the first output of the control circuit, electrically connected between the first terminal of the battery and the other of said terminals of the motor for energizing the motor to turn in a first direction in proportion to the width of the pulses; and
a second transistor, responsive to the second output of the control circuit, electrically connected between the other of said terminals of the motor and the second terminal of the battery for energizing the motor to turn in a direction opposite to said first direction in proportion to the width of the pulses.

11. The electrical power assisted steering system of claim 10 wherein the control circuit includes a plurality of circuits and a plurality of circuit monitors for detecting improper operation of the circuits and for disconnecting the motor from the battery when improper operation of any circuit is detected.

* * * * *